UNITED STATES PATENT OFFICE.

THE SIMPSON WATER PROOF MANUFACTURING COMPANY, OF NEW YORK, N. Y., ASSIGNEES OF EDWIN L. SIMPSON BY MESNE ASSIGNMENTS.

IMPROVEMENT IN THE MANUFACTURE OF FLOCKED FABRICS.

Specification forming part of Letters Patent No. 38,006, dated March 24, 1863; Reissue No. 1,688, dated May 31, 1864.

*To all whom it may concern:*

Be it known that EDWIN L. SIMPSON, of Bridgeport, in the county of New Haven and State of Connecticut, did invent a new and useful Improvement in the Manufacture of Flocked Fabrics; and I do hereby declare the following to be a full, clear, and exact description of the same.

This invention relates to an improvement in the manner of coating with flocks or their equivalent the surface of fabrics or articles to which it is desired to give the appearance of felt; and my invention consists in coating the surface of whatever it is desired to flock with an adhesive preparation; then sifting or otherwise covering in excess the prepared surface with flocks or their equivalent; then rolling or pressing the flocks upon the surface to cause a sufficient portion of the flocks to adhere to the surface; then brush, shake, or otherwise remove the excess from the surface, leaving the surface entirely and evenly flocked and finished.

Any preparation or compound of an adhesive nature may be used in preparing the surface to receive the flocks; and in describing the operation of flocking by this improved method I employ the water-proof compound for which I have applied for Letters Patent in even date herewith, simply because I am more familiar with that preparation than many others which may with equal facility be used, the preparation of the surface being no part of the invention. Therefore I will proceed to fully describe this invention, preparing the surface by the application of the compound before referred to.

I first spread upon the surface to be flocked one or more coats of the water-proof compound before mentioned, as the nature of the article may require; if for fabrics such as silks, light muslins, lawns, &c., two coats are sufficient; if for heavy goods—as for canton-flannels, duck, &c.—three or four coats are better. After these coats have become dry, I add one coat of the oil compound or varnish fully described in the aforesaid application for Letters Patent, and while the varnish is in an adhesive state I apply the flocks or their equivalent by sifting them in excess upon the varnished or adhesive surface, and apply pressure thereon by means of rollers or otherwise, and after sufficient pressing remove the excess or so much as do not adhere to the surface. I do this by means of a revolving brush; but other methods may answer the same purpose. When this is done, I hang the fabrics in a room heated to about 160° Fahrenheit for twenty-four hours, or longer if necessary. I then expose them to the sun and air for one day, more or less. The odor arising from the camphor or naphtha is entirely removed and the flocked fabrics are complete.

Thus I have fully illustrated the application of flocks to my own compound. When other compounds are used for the preparation of the surface, the process of preparation must be in accordance with the nature of the compound.

By "excess of flocks" I mean so much more than will adhere to the varnish as to positively insure the complete covering of the entire surface, and to prevent the roll or instrument used for pressure from ever coming in contact with the varnished surface.

As it is evident from the foregoing that various compounds may be used, I do not confine myself to any particular preparation of the surface; and being aware that fabrics and surfaces have been flocked, but without the excess and pressure I have described, I do not broadly claim coating fabrics or surfaces with flocks; but What I do claim as said SIMPSON'S invention, and desire to secure by Letters Patent, is—

Covering in excess a previously-prepared surface with flocks or their equivalent, rolling or otherwise pressing the same, and afterward removing the excess, substantially as and for the purpose specified.

SIMON STEVENS,
*President Simpson Water Proof Manufacturing Company, Assignees of E. L. Simpson, J. W. Post, and C. C. Post.*

Witnesses:
WM. I. F. MANICE,
J. FRANKLIN REIGART.

Attest:
HENRY M. DAKIN, [L. S.]
*Secretary.*